Jan. 20, 1970     J. D. FITZPATRICK ET AL     3,490,291

TRANSMISSION CONTROL

Filed July 15, 1968     2 Sheets-Sheet 1

INVENTORS
John D. Fitzpatrick,
Martin J. Ulrich, &
Robert F. Wheaton

BY    *A. M. Heiter*
ATTORNEY

United States Patent Office 3,490,291
Patented Jan. 20, 1970

3,490,291
TRANSMISSION CONTROL
John D. Fitzpatrick, Warren, Martin T. Ulrich, Huntington Woods, and Robert F. Wheaton, Utica, Mich., assignors to General Motors Corporation, Detroit, Mich., a corporation of Delaware
Filed July 15, 1968, Ser. No. 744,776
Int. Cl. G05g 9/00, 13/00
U.S. Cl. 74—473                                  6 Claims

ABSTRACT OF THE DISCLOSURE

The transmission and control system include the transmission with a valve member having a detent to resiliently position the valve member in each of 1st, 2nd, drive, neutral, reverse and part positions and a hand controlled linkage assembly connected by push-pull cable to the valve providing a direct operating mode of operation between the drive, neutral, reverse and park positions and providing only from the drive position a ratcheting mode of operation responsive to an upshift or a downshift single step movement of the handle to provide respectively a single step upshift and downshift of the transmission and automatic return of the handle to the spacial location occupied in the drive position. In the direct operating mode of operation a trigger holds a cross bar in a position for direct movement of a latching plate connected by the push-pull cable to the detented transmission control valve to establish park, reverse, neutral and the drive position and the detent bar engages detent cams on a detent plate in park and reverse and prevents further movement beyond drive to 2nd and 1st with the detent bar in the raised position. On release of the trigger permitting the detent bar to move into the lower ratcheting position where the detent plate permits one step movement of the handle from this drive position for either upshifting or downshifting and this movement engages pawls on the latching plate to provide shifting between drive, 2nd and 1st ratio forward drive positions in response to incremental upshift and downshift movements of the handle and a centering device automatically returns the handle to the spacial location for drive position so that a subsequent shift may be made by the same incremental displacement of the handle from the spacial drive position.

---

This invention relates to transmissions and controls therefor and particularly to a mechanical linkage control for an automatic type transmission.

The invention provides a control for an automatic transmission having manual control positions. Park for engaging the parking brake, Reverse for engaging reverse ratio, Neutral for disengaging the drive and establishing neutral, Drive for establishing an automatic control sequence providing automatic shifting between 1st, 2nd and 3rd ratios, Second position for establishing a 2nd ratio and First position for establishing a 1st ratio. The shift control linkage mechanism has a direct acting control range of movement providing direct control of the transmission control member in accordance with movement of the control handle between the automatic transmission control positions, drive, neutral, reverse and park, and detenting at drive, reverse and park. The linkage also provides a manual mode of operation for positively selecting one of the forward ratio positions, 1st, 2nd and drive in response to incremental one step upshift and downshift movement for shifting between the 1st, 2nd and drive transmission control positions and providing automatic return of the shift handle to the spacial position for drive ratio. In the direct actuating mode of operation for automatic control positions, a detent member is manually moved to engage the handle for movement with a cable control member directly controlling the transmission control member for shifting between drive, neutral, reverse and park positions with detenting by this detent member cooperating with a detent plate and/or detenting of the transmission control member.

In the manual control mode of operation the linkage is inoperative to provide any change in ratio in response to shift movement of the handle calling for a shift to an unavailable ratio such as an upshift from the drive position or a downshift from the 1st position. In 1st and 2nd ratio positions for the transmission the detent bar is locked in the forward ratio selection position and must be returned to the drive position before the detent bar can be moved so the hand lever can be shifted to the neutral, reverse or park positions.

An object of the invention is to provide an improved transmission control linkage having a manual control handle which when moved from one control position through a single increment shifts the transmission control to another control position and returns the control handle to the original position for subsequent single increment movement to shift the transmission control to another control position.

Another object of the invention is to provide an improved transmission control linkage having a manual control handle which when moved from one control position through a single increment shifts the transmission control to the next control position in a sequence and returns the control handle to the original position for subsequent single increment movement to shift the transmission control to the one or a third control position in the sequence and limits movement to consecutive positions in the sequence.

Another object of the invention is to provide in a transmission control linkage a control system providing directly in response to movement of a handle, detented movement of a controlled member between a plurality of positions and for movement of the handle from one of these positions in single step increments to move the controlled member only to consecutive positions in a sequence of other positions and automatic return movement of the handle to the one position so the same handle movement will establish a next consecutive control position for the transmission.

Another object of the invention is to provide in a transmission control linkage a control system providing directly in response to movement of a handle, detented movement of a controlled member between a plurality of positions and for movement of the handle to move the controlled member only to consecutive positions in a limited sequence, from only one of these positions in single step increments, and providing automatic return movement of the handle to the one position so the same handle movement will establish a next consecutive control position for the transmission in the sequence and permitting return to detent movement operation only from the one position.

These and other objects of the invention will be more apparent from the following description and drawing of a preferred embodiment of the invention.

Figure 1:
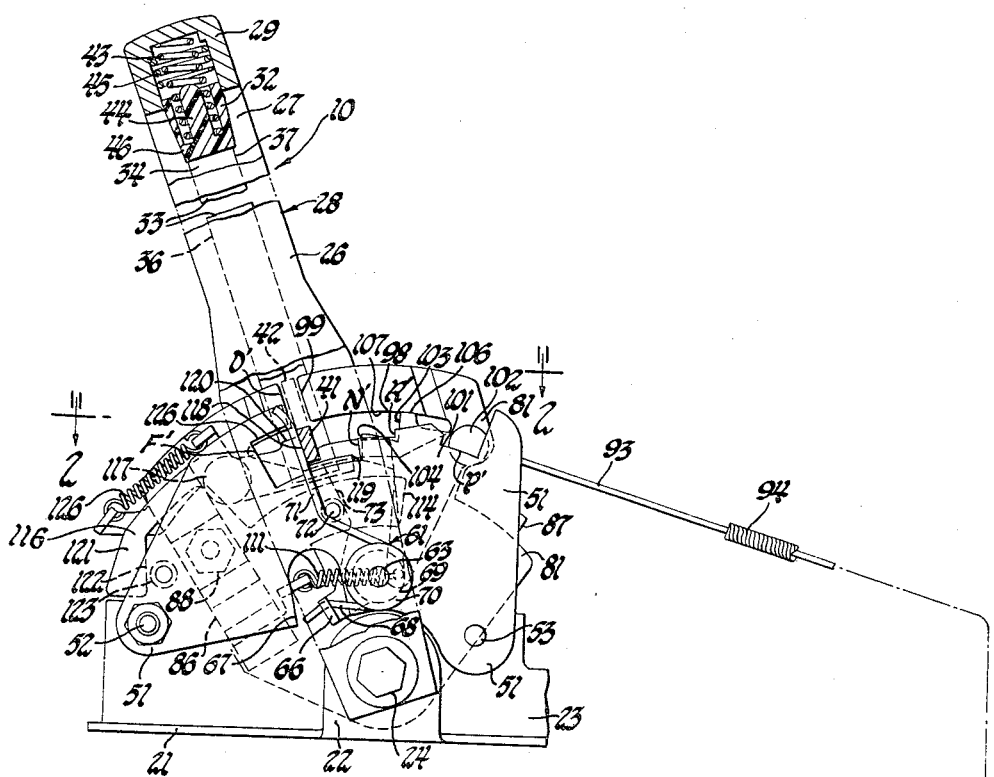
FIGURE 1 shows the transmission and the control linkage therefor schematically with parts in section showing details.
Figure 1:
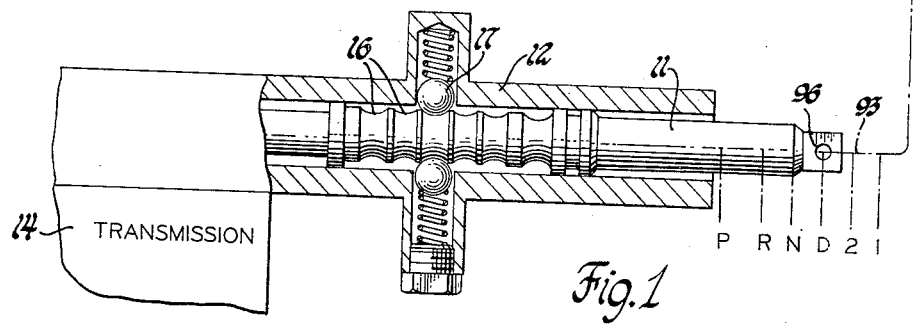
Figure 2:
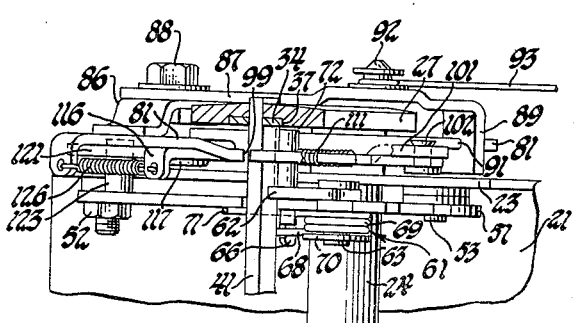
FIGURE 2 is a partial section of FIGURE 1 on the line 2—2.

The shift control linkage mechanism 10 provides ratcheting upshift and downshifting control between a plurality of forward ratios and may also provide for additional control movement to other manual control positions and is particularly suitable for a transmission having a controlled member which is moved consecutively to a plurality of forward drive ratio positions and which may also be moved to other control positions. An example of such a controlled member is the shift valve 11 for a typical automatic type transmission which is mounted in a valve body 12 forming a part of a suitable transmission 14. The valve member 11 has a plurality of grooves 16 which cooperate with the spring biased detent balls 17 to resiliently detent the valve in each of the following positions, first ratio 1, second ratio 2, drive or 3rd ratio D, neutral N, reverse R and park P. A typical transmission that could be controlled by the linkage system shown herein is disclosed in the 1968 Oldsmobile Chassis Service Manual published in 1967 in section 7 having a manual shift valve moved through the equivalent sequence of positions with a detent cooperating with its operating lever. The Fisher et al. Patent 3,101,011, issued Aug. 20, 1963, also shows a transmission and control system having a similar shift valve.

The manual control linkage 10 is mounted on a support base 21 having side portions 22 and 23 suitably apertured to receive the main pivot pin 24 which pivotally supports the legs 26 and 27 of a U shaped control handle structure 28 having at the base of the U a cross handle portion 29. The cross handle 29 is hollow and has telescopingly mounted therein a detent trigger 32 which is secured at each end to the detent links 33 and 34 which are slidably mounted in grooves 36 and 37 in the legs 26 and 27 respectively of the control handle 28. The lower ends of the links 33 and 34 are apertured to receive the detent cross bar 41 to cause it to move radially with the links on movement of the detent trigger 32 and to move circumferentially when the handle 28 is rotated. The actuator member or cross bar 41 also extends through an elongated recess 42 in the handle leg 27 and a similar recess in the other leg 26 so that the cross bar moves circumferentially on rotary movement of the handle 28 about its pivot pin 24 without placing a binding load on the links 33 and 34. The recesses limit movement of detent bar 41. A spring 43 between the fixed handle 29 and the detent trigger 32 biases the trigger and through the links the detent cross bar 41 to the engaged or lower position shown in FIGURE 1. A pin 44 on the detent handle guides the spring and may limit the manual upward movement of the detent handle and shoulders 46 on the detent handle and the fixed handle may limit downward movement of the detent handle by the spring 43. A short spring 45 or a caged spring fixed in the handle 29 engages the trigger 32 to provide an intermediate detent point when detent bar 41 just clears the top of centering lever 62 and neutral notch N¹ for rocking shifting between reverse and drive.

A detent plate 51 is secured to and spaced from the side portion 23 of the base plate by fasteners 52 and 53 and has an upper cam surface for cooperation with the detent bar 41 when in the upper position in slot 99 of latching plate 81 having a parking position pocket P¹, a reverse position notch R¹, a neutral position notch N¹ and a drive position stop surface D¹ and a straight forward position opening F¹ which does not engage and thus permits free movement of the cross bar 41 through the ratcheting position but limits movement to this range of positions.

The centering spring mechanism 61 has a centering lever 62 pivotally mounted on a pin 63 and located on the back side (FIGURE 1) of the plate 51. The lever 62 has a cross tab portion 66 extending through a clearance recess 67 in the plate 51 and engaging the end 68 of coil spring 69 which is wrapped around pin 63 and held in place by washer 70. The other end 71 of the coil spring engages stop pin 72 and cross bar 41. The coil spring is wound to bias the lever 62 and spring end portion 71 into engagement with pin 72. The lever 62 has a cam portion 73 engaging the pin 72 and the detent cross bar 41 and functions with the spring portion 71 to center the cross bar when it is in the lower position shown in alignment with the pin 72 in the central position of the free space F' and N' in the detent plate 51.

The controlled member or latching and detenting plate 81 is suitably apertured for pivotal mounting on the pin 24 and is laterally located by spacing washers between the side 23 of the base and the handle leg 27. The latching plate has a bridge piece 86 welded thereto to provide a securing surface on the other side of the leg 27 for the adjustable cable plate 87. The cable plate is slotted so it may be secured in adjustable positions with respect to the latching plate 81 by a fastener i.e., bolt 88, which extends through a slot in the plate 87 and is secured to the bridge part 86 of the latching plate 81. The other end of the cable plate 87 has a laterally extending ear 89 fitting into a slot 91 in the edge of the latching plate 81 to pivotally connect the cable plate to the latching plate to permit the adjustable movement at the other end when the fastener 88 is loosened for adjustment of the relative position of the cable plate with respect to the latching plate. A cable or actuator pin 92 is secured to the cable plate 87 and the push-pull cable 93 is secured thereto and extends through a sheath 94 fastened to a fixed support. The other end of cable 93 is attached to the connecting part 96 of the valve member 11. The latching plate 81 has an arcuate recess 98 permitting free relative movement between the latching plate and the detent cross bar 41 when the detent cross bar is in the lower position shown in FIGURE 1 and a slot 99 which receives the cross bar 41 when in the upper position to prevent relative movement between the cross bar and the latching plate. The upshift pawl 101 is pivotally mounted on the latching plate 81 by pivot pin 102 and has a 1–2 upshift cam surface 103 and a 2–3 upshift cam surface 104. The 2–3 upshift cam surface 104 is spaced from the 1–2 upshift surface 103 by the distance of this shift movement increment. The pawl 101 also has a stop portion 106 which engages the inside surface 107 of the radially outer portion of latching plate 81 beyond the perimeter of recess 98 which is laterally displaced to be in radial alignment with the pawl to limit the clockwise movement of pawl 101 provided by the biasing spring 111 hooked in suitable apertures in the lower end of the pawl 101 and the latching plate 81. On a 2–1 shift, cam surface 114 on pawl 101 hits pin 72 to move 2–3 cam surface 104 below detent bar 41. The downshift pawl 116 is pivoted by pin 117 to the latching plate 81 and has a 3–2 downshift cam surface 118 and a 2–1 downshift cam surface 119 which are spaced apart by the shift distance required. Pawl 116 also has a stop surface 120 cooperating with the inner face 107 of recess 98. Cam pawl 116 has a tail section 121 having a cam surface 122 cooperating with a pin 123 fixed to the detent plate, to move the 2–1 downshift cam 119 out of alignment with the detent bar 41 when latching plate 81 is in the D' position shown in FIGURE 1. A spring 126 connected to suitable ears on the downshift pawl 116 and the latching plate 81 biases it in a counter-clockwise direction for engagement of the stop surface 120 with the surface 107 and the cam surface 122 with the pin 123.

OPERATION

When the shift control linkage, including handle 28, detent bar 41 and latching plate 81, is in the third drive position shown in FIG. 1, the detent trigger 32 may be squeezed or moved upwardly. The detent links 33 and 34 and the cross bar attached thereto move upwardly. This upward movement is limited when the cross bar 41 engages the upper end of the slots in the handle legs such as slot 42 in leg 27 or stop 44 engages handle 29. The detent bar 41 is then in the slot 99 in the latching plate 81 and rotary movement of the handle assembly 28 in a counter-clockwise direction is prevented by stop surface D' but permitted in a clockwise direction toward the neutral, reverse and park positions and the top of centering lever 62 and detent plate 51 keep bar 41 in slot 99. The first increment of this movement will actuate through the cable 93 the valve 11 to the neutral position N. Since the neutral notch N' is low there will not be detent in the handle structure at the neutral position but the neutral position will be indicated by the detent 17 for the valve member 11. On the next increment of movement detent bar 41 will engage the reverse notch R' of detent plate 51 and stop movement for rocking shifting between third drive and reverse. Then if the handle bar is lifted completely beyond the intermediate detent provided by the short spring 45 in the handle to move over a detent projection and into the parking pocket or notch P'. During this movement and a similar return movement to the drive position, where detent bar 41 engages stop D' on detent plate 51, the handle structure is directly connected by the detent bar 41 being in the slot 99 of the latching plate 81 and this plate moves the cable adjustment plate 87 with it and thus provides the push-pull movement on the cable 93 to directly move the valve member 11 to each of these positions. When the latching plate 81 and thus valve 11 is in first or second position, the detent bar 41 will engage surface 107 and cannot be lifted. When the latching plate 81 is in second and handle 28 is in the downshifted position, surface 107 on the detent plate 51 prevents lifting the detent bar 41. When latching plate 81 is in the drive position and the handle 28 is upshifted surface 107 of the latching plate prevents lifting the detent bar.

Figure 3:
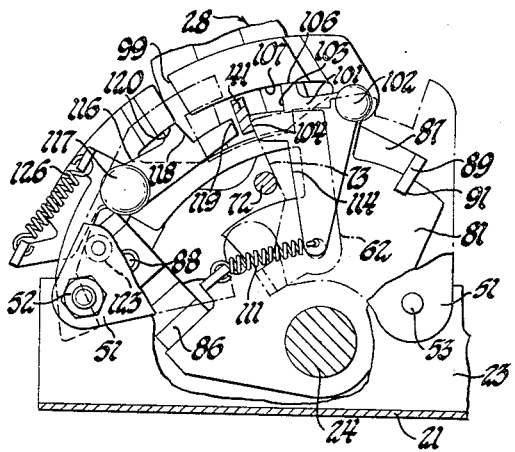
FIGURE 3 is a partial view showing the latching mechanism in the second position.

When the handle 28 is in the drive position shown in FIG. 1 with the trigger 32 released it is in position for incremental shifting of the latching plate 81 and valve 11 between drive or third drive, second drive and first drive positions and the handle will always return after each shift to the drive position shown in FIG. 1. If the transmission control linkage 10 and the valve member 11 are in the drive position shown in FIG. 1 and the handle 28 is given an inadvertent upshift movement, the detent bar 41 will merely move the centering lever 62 clockwise until the bar 41 hits the neutral notch N¹; and since it cannot engage the upshift surface 104 on the pawl 101, there is no movement of the latching plate and valve member 11. The centering lever 62 will merely return the handle 28 to the drive position. When a proper downshift incremental movement of handle 28 is made from the drive position shown in FIG. 1 the downshift pawl 116, due to the engagement of cam surface 122 on tail 121 of this pawl engaging pin 123 fixed to the detent plate 51 under the bias of spring 126 the pawl 116, is positioned so that the 2-1 downshift surface 119 is not engaged by the bar 41 but the 3-2 downshift surface 118 is engaged by the bar 41 hits the neutral notch N¹; and since it cannot 93 the valve member 11 to the second drive position. The centering mechanism 62 will then return the handle structure 28 to the centered or drive position while detent 17 will hold valve 11 and latching plate 81 in second position. When the handle structure 28 is moved in an incremental downshift movement in engagement with the 3-2 downshift surface 118 of cam 116 the latching plate 81 assumes the second drive position shown in FIG. 3 where the centering mechanism 61 has returned the detent bar 41 to the centered position and the cam surface 122 on tail 121 of pawl 116 has moved away from the pin 123 to permit the spring 126 to rotate the pawl 116 counter-clockwise until stop 120 engages surface 107 as shown in FIG. 3 so that the 2-1 shift portion 119 is aligned with detent bar 41.

When the transmission valve member 11 and latching plate are in the second drive position and the centering system has returned the handle 28 to the center or drive position, the control downshift is conditioned for a 2-1 downshift or a 2-3 upshift. If the handle is again moved through an incremental downshift movement, the detent bar 41 will engage the 2-1 downshift cam 119 and further rotate the latching plate 81 and cable adjustment plate 87 counter-clockwise to the first drive position and through the push-pull cable 93 position the valve member 11 in the first drive position. When first drive position is thus initially reached, the latching plate 81 and detent bar 41 are in the solid line first position shown in FIG. 4. Thereafter, through the valve detent 17 holds the valve 11 and latching plate 81 in this first position, the centering mechanism returns the detent bar 41 to the dotted line position where it is in a position to engage the 1-2 upshift cam 103 of the upshift pawl 101. The detent bar 41 during this centering movement, does not engage the 2-3 upshift cam surface 104 because during the 2-1 downshift the pawl 101 at the cam surface 114 engaged a portion of the centering pin 72 and rotated the pawl 101 counter-clockwise to depress cam surface 104 below detent bar 41.

Figure 4:
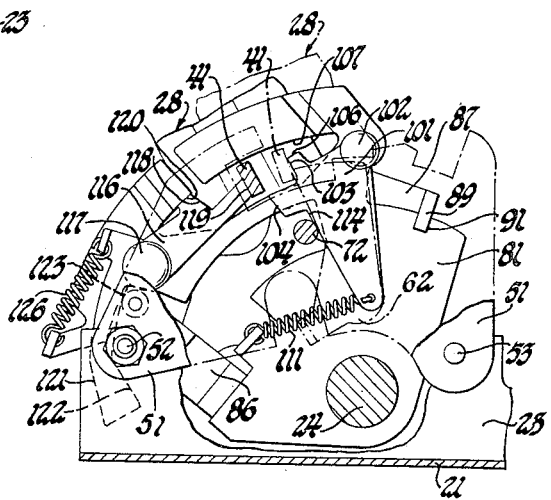
FIGURE 4 is a partial view showing the latching mechanism in solid lines on the completion of a 2nd to 1st position shift and in dotted lines the detent member in centered position.

Thus if the control system is in the position shown in FIG. 4 with the handle structure centered with the shift bar in the dotted line position, an incremental downshift movement will have no effect. On an incremental upshift movement detent bar 41 will engage the 1-2 upshift surface 103 of pawl 101 and rotate the latching plate 81 to the second speed position where it will be held by the valve detent. After the centering mechanism has returned the handle structure and the detent bar 41 to the centered or drive position, the pawl 101 having been moved away from pin 72 will be rotated by the spring 111 in a clockwise direction so that the 2-3 upshift cam surface 104 is in alignment with the detent bar 41. The position of the mechanism following this 1-2 upshift is the same as following the above described 3-2 downshift.

Figure 5:
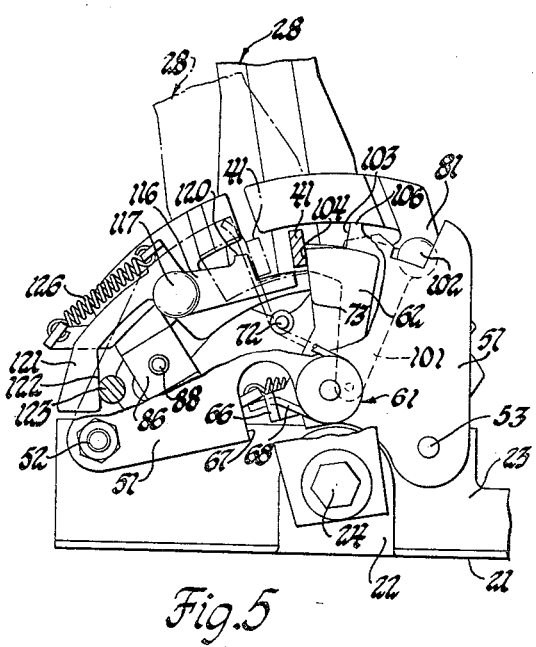
FIGURE 5 is a partial view showing the latching mechanism in solid lines when upshifted from 1st to 2nd and in dotted lines the detent bar in the centered position for a subsequent shift.

Thereafter an incremental upshift movement of the handle structure to the solid line position will move the latching plate 81 and valve 11 to the third drive position as shown in FIG. 5. Then the lever 62 of the centering mechanism will move the detent bar and handle structure from this position to the drive position shown in dotted lines.

It will be appreciated that the above described specific embodiment may be modified within the spirit of the invention.

We claim:

1. In a transmission control; a support, a handle member having an actuator member pivotally mounted on said support, a controlled member pivotally mounted on said support for movement through a predetermined increment of movement to each of three drive positions; means to bias said handle member to a central position and to permit upshift movement in one direction through a like increment of movement and downshift movement in an opposite direction through a like predetermined increment of movement; detent means operatively connected to said controlled member to resiliently hold said controlled member in each of said three drive positions; downshift means on said controlled member coacting with said actuator member and when said handle is moved through a downshift increment from said central position is operative when said controlled member is in a third position to shift said controlled member to a second position and is operative when said controlled member is in said second position to shift said controlled member to a first position and upshift means on said controlled member coacting with said actuator member and when said handle is moved through an upshift increment from said central position is operative when said controlled member is in a first position to shift said controlled member to the second position and is operative when said controlled member is in the second position to shift said controlled member to the third position.

2. The invention defined in claim 1 and said three drive positions being a low, intermediate and high drive positions.

3. The invention defined in claim 2 and said controlled member also being movable to another drive position and detent means operatively connected between said handle member and said support permitting free movement of said handle member from said central position through said upshift and downshift increments and movable when said controlled member is in only one of said three drive positions to engage and move said controlled member to said another drive position.

4. The invention defined in claim 3 and said another drive position being a reverse drive position.

5. The invention defined in claim 1 and said controlled member also being movable to another position and detent means cooperatively connected between said handle member, said controlled member and said support permitting movement of said handle member only from said centered position when said controlled member is only in one of said drive positions to engage and move said controlled member to said another position.

6. In a transmission control; a support, a handle member pivotally mounted on said support and having an actuator member manually moved between an engaged and disengaged position, a controlled member pivotally mounted on said support for movement through a predetermined increment of movement to a first, second and third forward drive positions, neutral, reverse and park positions; means to bias said handle member to a central position at said third forward drive position and to permit upshift movement in one direction through a like increment of movement and downshift movement in an opposite direction through a like predetermined increment of movement; detent means operatively connected to said controlled member to resiliently hold said controlled member in each of said positions; said manually moved actuator member, when in engaged position, being movable only when said handle and controlled member are in said third forward drive position to engage said controlled member for joint movement with said handle member for movement to said positions other than said forward positions; and stop means on said support engaging said actuator member to stop said handle member at said reverse and park positions; downshift means having a pawl pivoted on said controlled member coacting with said actuator member, when in disengaged position, and when said handle is moved through a downshift increment from said central position is operative when said controlled member is in a third position to have a 3–2 cam surface engage said actuator member to shift said controlled member to a second position and is operative when said controlled member is in said second position to have a 2–1 cam surface engage said actuator member to shift said controlled member to a first position and upshift means on said controlled member coacting with said actuator member and when said handle is moved through an upshift increment from said central position is operative when said controlled member is in a first position to have a 1–2 cam surface engage said actuator member to shift said controlled member to the second position and is operative when said controlled member is in the second position to have a 2–3 cam surface engage said actuator member to shift said controlled member to the third position.

References Cited

UNITED STATES PATENTS 3,292,450  12/1966  Hurst et al. _____ 74—473

MILTON KAUFMAN, Primary Examiner

PO-1050
(5/69)

UNITED STATES PATENT OFFICE
CERTIFICATE OF CORRECTION

Patent No. 3,490,291    Dated January 20, 1970

Inventor(s) John D. Fitzpatrick, Martin T. Ulrich and Robert F. Wheaton

It is certified that error appears in the above-identified patent and that said Letters Patent are hereby corrected as shown below:

Column 5, line 61, "hits the neutral notch $N^1$; and since it cannot" and insert -- to move the latching plate 81 and through cable --;  Column 6, line 16, the word "through" should be -- though --.

SIGNED AND
SEALED

JUL 21 1970

(SEAL)
Attest:

Edward M. Fletcher, Jr.
Attesting Officer

WILLIAM E. SCHUYLER, JR.
Commissioner of Patents